US012137666B2

(12) United States Patent
Pistochini et al.

(10) Patent No.: US 12,137,666 B2
(45) Date of Patent: Nov. 12, 2024

(54) METHOD AND APPARATUS FOR OPTIMIZING ENERGY AND WATER USED FOR COOLING LIVESTOCK

(71) Applicant: The Regents of the University of California, Oakland, CA (US)

(72) Inventors: Theresa Pistochini, Davis, CA (US); Elizabeth Chen, Davis, CA (US); Vinod Narayanan, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 486 days.

(21) Appl. No.: 17/761,739

(22) PCT Filed: Sep. 22, 2020

(86) PCT No.: PCT/US2020/052024
§ 371 (c)(1),
(2) Date: Mar. 18, 2022

(87) PCT Pub. No.: WO2021/055995
PCT Pub. Date: Mar. 25, 2021

(65) Prior Publication Data
US 2022/0378008 A1 Dec. 1, 2022

Related U.S. Application Data

(60) Provisional application No. 62/903,929, filed on Sep. 22, 2019.

(51) Int. Cl.
*A01K 1/00* (2006.01)
*G01W 1/10* (2006.01)

(52) U.S. Cl.
CPC ............. *A01K 1/0082* (2013.01); *G01W 1/10* (2013.01)

(58) Field of Classification Search
CPC .............................. A01K 1/0082; Y02A 40/70
See application file for complete search history.

(56) References Cited

U.S. PATENT DOCUMENTS

2009/0314216 A1* 12/2009 Polak .................. A01K 1/0082
239/222.11
2010/0012040 A1 1/2010 Pow et al.
(Continued)

FOREIGN PATENT DOCUMENTS

WO 2019027319 A1 2/2019

OTHER PUBLICATIONS

Turner et al., "Micro-Sprinker and Fan Cooling for Dairy Cows: Practical Design Considerations", Jun. 30, 1992, retrieved from https://uknowledge.uky.edu/cgi/viewcontent.cgi?article=1018&context=aen_reports.
(Continued)

*Primary Examiner* — Lionel Nouketcha
(74) *Attorney, Agent, or Firm* — Park, Vaughan, Fleming & Dowler LLP

(57) ABSTRACT

Systems and methods are provided for controlling heat stress and accumulations in livestock using the application of water sprays onto the animal in conjunction with fan induced airflow. The system has a controller with sensor inputs of the ambient environment including temperature, humidity, wind speed, and surrounding surface temperature sensors and fan and spray control outputs. To achieve savings in water and electricity, a transient, one-dimensional simultaneous heat and mass transfer model of evaporation within the wetted fur layer of a dairy cow is used to estimate drying time and heat rejection rate based on ambient conditions along with a control algorithm to predict the fan speed and sprinkler operation frequency needed to meet specified cooling load thresholds given the outdoor conditions. Estimated savings demonstrated that the model-based
(Continued)

controller could reduce annual electricity and water consumption by 20% and 40%, respectively.

22 Claims, 8 Drawing Sheets

(56) References Cited

U.S. PATENT DOCUMENTS

| | | |
|---|---|---|
| 2010/0170446 A1 | 7/2010 | Manneke et al. |
| 2012/0199080 A1 | 8/2012 | Siddons |
| 2016/0363340 A1 | 12/2016 | Shikii et al. |

OTHER PUBLICATIONS

Spiers et al., "Strategic application of convective cooling to maximize the thermal gradient and reduce heat stress response in dairy cows", Jun. 21, 2018, retrieved from https://www.sciencedirect.com/science/article/pii/S0022030218305903.

* cited by examiner

METHOD AND APPARATUS FOR OPTIMIZING ENERGY AND WATER USED FOR COOLING LIVESTOCK

CROSS-REFERENCE TO RELATED APPLICATIONS

This application claims priority to, and the benefit of, U.S. provisional patent application Ser. No. 62/903,929 filed on Sep. 22, 2019, incorporated herein by reference in its entirety.

STATEMENT REGARDING FEDERALLY SPONSORED RESEARCH OR DEVELOPMENT

Not Applicable

STATEMENT REGARDING FUNDING BY THE STATE OF CALIFORNIA

This invention was made with State of California support under California Energy Commission grant number EPC-16-010. The Energy Commission has certain rights to this invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to livestock cooling systems and methods, and more particularly to a system and method with environmental sensors, sprayers and variable speed fans and a system controller modulating the fan speed and sprinkler operation frequency needed to meet specified cooling load thresholds. System control is based on a transient, one-dimensional simultaneous heat and mass transfer model of evaporation within the wetted fur layer of a dairy cow to estimate drying time and heat rejection rate based on ambient conditions and to achieve savings of water and electricity.

2. Background

The excessive accumulation of heat in dairy cattle, referred to as heat stress, is detrimental to animal health and causes significant economic losses in the U.S. dairy industry with an estimated $1.5 billion in losses annually. These economic losses are associated with reduced milk production, decreased reproductive efficiency and, in extreme cases, death.

Concerns over livestock heat stress have escalated as average annual temperatures in the United States have increased 1.8° F. from the years 1895 to 2016 and ambient temperature extremes are projected to increase in frequency.

Heat stress occurs when hot environmental conditions disrupt the thermal balance of cows by limiting their ability to dissipate metabolic heat. In addition to metabolic heat, heat will flow from the environment to the animal when the temperature of the air or surrounding surface exceeds that of the coat surface, thus imposing a further heat load.

While physiological regulation mechanisms such as panting provide a means to increase heat dissipation and help maintain appropriate body temperature, health and milk production decline when the cow resorts to such measures to cope with heat stress. Moreover, under very hot conditions, the cow may still overheat since these physiological mechanisms can no longer dissipate the heat sufficiently.

Shaded corral structures have been used to shield cattle from environmental radiation and convection contributions to help alleviate the heat load during times of feeding or resting. Although shaded corral structures may provide shade to cows during feeding, it is common for daytime temperatures in semi-arid climates to rise to dangerously high levels, even in such shaded areas.

Another common strategy to increase the rate of heat dissipation from cattle, and thus alleviate heat stress, involves the application of water sprays onto the animals in conjunction with a fan-induced airflow. Combined sprinkler and fan systems result in rapid evaporation of water from the coat, which can provide a significant cooling effect especially in hot and dry climates. Such evaporative cooling techniques have been shown to reduce body temperature and increase milk production. In the United States, a combination of shade (to reduce the radiant heat load), water spray, and forced air circulation is typically employed in dairies that have at least 500 cows.

Although widely used, the evaporative cooling process is not standardized, with details such as spray duration, spray frequency, and the overall amount of water applied largely determined by ranchers based on their perceived comfort of the cows. Even in similar climates, water use in dairy facilities can vary considerably. It is difficult to optimize the operation of cooling equipment (i.e. fans and sprayers) because heat stress in cows is dependent on ambient temperature, humidity, solar radiation (e.g. from direct sun exposure or hot roof surfaces), and accumulated heat load, which can result from insufficient night-time cooling from the previous day.

Another significant drawback found in prior art systems is that water sprayed for cooling in excess of what is needed may increase the incidence of diseases such as leptospirosis or mastitis.

Optimal use of electricity and water for cooling is critical to improve the sustainability and financial viability of the dairy industry. The increasing occurrence of drought and heatwave conditions may limit water availability during the hottest parts of the year when water is need most. Furthermore, electricity used for fans and well-pumping influences greenhouse emissions, particularly in the hot evening hours as electricity production from solar photovoltaics declines. Therefore, the ability to reduce heat stress in animals, while reducing water and electricity consumption, is a key issue for dairy production in the United States.

To this end, some experimental studies have focused on the sprinkler system itself, seeking to optimize cooling and water consumption by adjusting parameters such as droplet size and flow rate. Others have proposed mathematical models for heat transfer through a cowhide, but they typically restricted their attention to steady-state conditions and dry fur. These steady-state models illustrated the efficacy of spray cooling. However, they do not provide information on drying time or heat rejection rates once the sprayers are turned off. Consequently, there is a need to develop a transient model of the drying process from a wetted cowhide so that water and energy use can be optimized to alleviate heat stress.

BRIEF SUMMARY

Systems and methods are provided for managing heat load and reducing heat stress in livestock and other animals. The system utilizes sensors for sensing the ambient environment and a system controller that dynamically controls the fan speed and sprayer actuation and the rate of heat dissipation withing the sensed environmental conditions. To reduce heat stress, that decreases milk production and contributes to health and breeding complications, dairy cows are cooled by intermittent water sprays. After each spray application, water droplets distributed throughout the hide gradually evaporate, providing cooling as they absorb heat from the cow. Fans are employed to increase convection coefficients and to promote evaporation to achieve a target heat rejection rate.

The rate at which the cow rejects or dissipates heat to the environment is dependent on the ambient environment including air temperature, humidity, wind speed, and surrounding surface temperatures (e.g. roof temperatures). Accordingly, the system controller and control methods use a first principles heat transfer model of a dairy cow and data about the ambient environment to determine the optimal operation of cooling equipment (e.g. water spray rate and fan speed). Sensor inputs into the system controller may include, but are not limited to, ambient temperature, humidity, wind speed, occupancy and roof temperature. Environmental information such as weather forecasts may also be used for confirming or predicting expected future temperatures, humidity, and wind in a geographical location.

Simplified correlations from a heat transfer model are used to predict a temporal heat transfer rate and drying time for the wet cow. The resulting heat transfer rate is used to increase or decrease the fan speed over time to ensure that a minimum cooling rate for the cow is maintained. The resulting drying time is also used to operate the water spray frequency to ensure that that cow is always wet without wasting water.

Compared to existing controllers, the present controller accurately determines an optimal fan speed and water spray rate. This reduces the amount of electricity used by fans and reduces amount of water used for sprayers, as well as reducing the electricity used for pumping this water from wells. The controller can also be used to control existing cooling equipment at a dairy. Further, application of the controller is not limited to cooling dairy cows. The controller can be adapted to control cooling systems for any livestock that uses water sprayers and/or fans.

Water efficiency is improved by matching the sprinkler off-time to the cow drying time corresponding to the current outdoor environmental conditions. In one embodiment, the spray off time is matched with a selected percentage of the predicted drying time in the range of 50% to 100% of the predicted time. The sprayer is actuated when the predicted percentage of drying time is reached.

Electricity use can also be reduced by varying fan speed to achieve the required heat rejection rate for a given set of outdoor conditions. To enable such water and electricity savings, a system controller based on a transient, one-dimensional simultaneous heat and mass transfer model of evaporation within a wetted fur layer of a dairy cow is used to estimate drying time and heat rejection rate based on ambient conditions. The drying time and heat rejection rate are used to set spray frequency and fan speed (i.e. air flow) to optimize cooling and reduce water and electricity use. Electricity and water use can also be optimized with an occupancy or proximity sensor that limits fan use and spray actuation when the livestock are absent from the pen or coverage of the system.

Because heat stress in dairy cows has cumulative impacts (i.e. builds up over several hot days or weeks), in one embodiment the controller can be used to calculate cumulative heat rejection rates over time and accumulated heat loads and can track unmet cooling needs due to the residual heat stress. Increased cooling rates and spray treatment durations can be used to dissipate the accumulated heat load. The controller can also use weather forecast data to even further optimize the use of electricity for fans and water for sprayers.

In one embodiment, the control algorithm is based on heat transfer rates and drying times calculated from best-fit correlations derived from a model. In one embodiment, the controller includes a lookup table or set of simple equations that select fan speed and water spray interval based on ambient temperature and humidity.

According to one aspect of the technology, a system is provided with a system controller based on a transient, one-dimensional simultaneous heat and mass transfer model of evaporation within a wetted fur layer of a dairy cow to estimate drying time and heat rejection rate based on current ambient conditions.

According to another aspect of the technology, a system is provided that predicts the fan speed and sprinkler operation frequency needed to meet a certain cooling load threshold given outdoor conditions.

A further aspect of the technology is to provide a system that is industrially scalable, predictable and has low operating costs.

Another aspect of the technology is to provide a system that matches the sprinkler off-time to the cow drying time corresponding to current outdoor environmental conditions including outdoor air temperature, humidity and radiant conditions.

A further aspect of the technology is to provide a system that reduces electricity use by varying fan speed to achieve the required heat rejection rate for a given set of outdoor conditions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, systems and methods for monitoring and optimizing water and energy for cooling and reducing heat stress in livestock are generally shown. Several embodiments of the technology are described generally in FIG. 1 through FIG. 8B to illustrate the characteristics and functionality of the devices, systems and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

To reduce heat stress that contributes to milk production and breeding complications, dairy cows are typically cooled by intermittent water sprays coupled with fan-induced air flow. The current industry standard utilizes fixed duration on and off-cycles; however, water efficiency is improved with the present technology by matching the sprinkler off-time to the cow drying time corresponding to current outdoor environmental conditions. Electricity use can also be reduced by varying fan speed to achieve the required heat rejection rate for a given set of outdoor conditions. To enable such water and electricity savings, a transient, one-dimensional simultaneous heat and mass transfer model of evaporation within a wetted fur layer of a dairy cow is used to estimate drying time and heat rejection rate based on ambient conditions and control the fan speed and sprayer actuation frequency.

In addition, residual accumulated heat load from metabolic or environmental sources of livestock can be monitored and tracked by the control system. The controller can increase fan speed and spray frequency as well as extend the duration of the cooling treatments until the accumulated heat load is dissipated.

Figure 1:
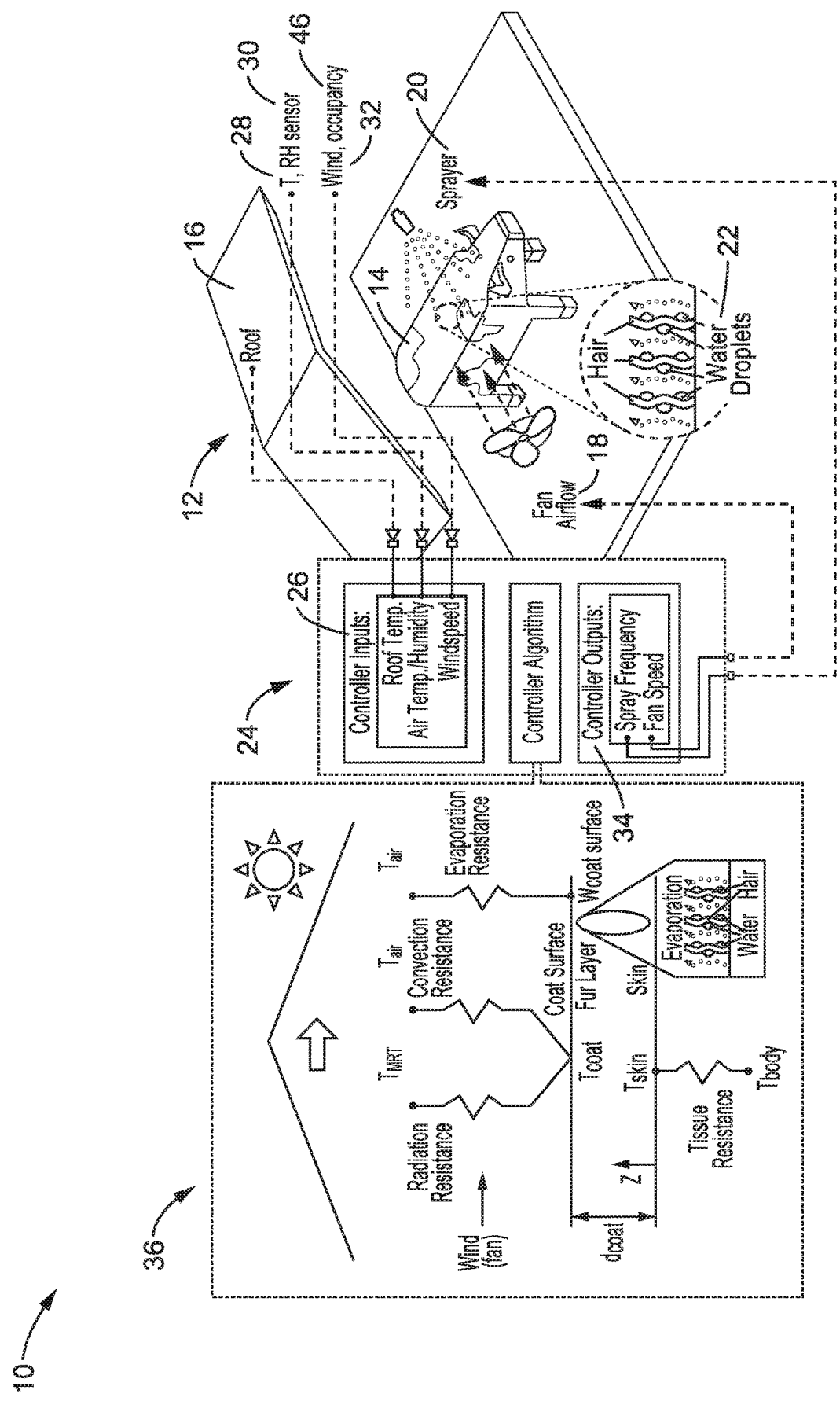
FIG. 1 is a schematic system diagram showing an overall system according to an embodiment of the presented technology. A one-dimensional transient coupled heat and mass transfer model is developed and used to formulate a controller algorithm. The algorithm can be used to set the spray frequency and fan air speed to achieve desired cooling rates from the cow.

Turning now to FIG. 1, an embodiment of the system 10 and method for increasing the rate of heat dissipation from the cow 14, and thus alleviate heat stress, with the controlled application of water sprays in conjunction with a fan-induced airflow is shown schematically. The system 10 uses a system controller 24 with a transient, spatially one-dimensional model programming 36 for predicting the drying process from the instant that the spray is turned off. The controller 24 also determines fan speed and time intervals between successive spray applications as a function of outdoor conditions to help maintain thermal balance and avoid heat stress.

In the embodiment shown in FIG. 1, the system 10 has several sensors for monitoring the environmental conditions in a building 12 housing cattle 14 such as a barn or corral. The sensors provide periodic or continuous sensor inputs to the system control 24. In this illustration, one or more roof temperature sensors 16, air temperature sensors 28, relative humidity sensors 30, occupancy or proximity sensors 46 and windspeed sensors 32 are used as controller inputs 26. In one embodiment, environmental information such as weather forecasts may be used for expected future temperatures, humidity, and wind as additional controller inputs 26. The controller outputs 34 of the system control 24 set the spray frequency and volume of sprayer 20 as well as control over the fan air speed of the fan 18 to achieve the desired cooling rates from the cow 14.

In the embodiment shown in FIG. 1, the electricity and water use can also be optimized by the optional occupancy or proximity sensor 46 that senses the presence of livestock within the range of the system sprayers and fans and limits the sprayer and/or fan use when the livestock are absent.

The system control algorithm 36 formulates and controls the controller outputs 34 to the sprayers 20 and fans 18 and utilizes a model that predicts the fan speed and sprinkler operation frequency needed to meet certain cooling load thresholds given the outdoor conditions sensed by the input sensors. The one-dimensional, transient, coupled heat and mass transfer model algorithm performs parametric analyses to estimate drying time as a function of outdoor air temperature, air speed, humidity, and mean radiant temperature.

The system control algorithm can then predict the fan speed and sprinkler operation frequency needed to meet specified cooling load thresholds given the outdoor conditions. Water application may be optimized by matching the sprinkler off-time to the cow drying time that corresponds to current outdoor environmental conditions. The sprinkler off-time can also be matched to a percentage of the predicted drying time. For example, the spray off time can be matched with a selected percentage of the predicted drying time in the preferred range of approximately 50% to approximately 100% of the predicted drying time. The sprayer is actuated when the predicted percentage of drying time is reached increasing the frequency of spraying events. Electricity use can also be reduced by varying fan speeds to achieve the required heat rejection rate for a given set of conditions.

Control programming and algorithms 36 may also monitor over time and track accumulated heat loads experienced by livestock from metabolic and environmental sources.

Minimum cooling thresholds and cooling treatment durations may be selected or adjusted to account for residual heat loads. Such tracking can account for heat load accumulations from trends of high daytime temperatures and unusually warm nighttime temperatures where heat dissipation is insufficient to reach desired levels. Control programming thresholds may be set to a desired cooling rate or may be set to a desired minimum cooling rate over time.

The preferred model of the system control programming 36 assumes that the cow is located in a shaded structure, such as a free stall barn, and is in a standing position as shown in FIG. 1. Heat and mass transfer (water vapor) through the coat are modelled as one-dimensional in the z direction normal to the skin surface. A representative patch of wet cowhide 22 is shown schematically in FIG. 2 with the skin surface at Z=0 and the coat surface at Z=$d_{coat}$. The drying front of the fur progresses from the coat surface and from the skin towards the center of the coat. The model preferably incorporates variables of radiation resistance 38 ($T_{MRT}$), convection resistance 40 ($T_{air}$), evaporation resistance 42 ($M_{H2O}$, air) and tissue resistance ($T_{body}$).

After each spray application, water droplets distributed throughout the hide gradually evaporate, providing cooling as they absorb the acquired latent heat from the cow. Fans 18 are employed to increase convection coefficients and promote evaporation. The system controller 24 predicts the drying process from the instant that the spray is turned off and then determines the time point needed before the application of the next spray. Such a model thereby allows for determination of the time interval between successive spray applications and the duration of those applications as a function of current outdoor conditions.

Figure 2:
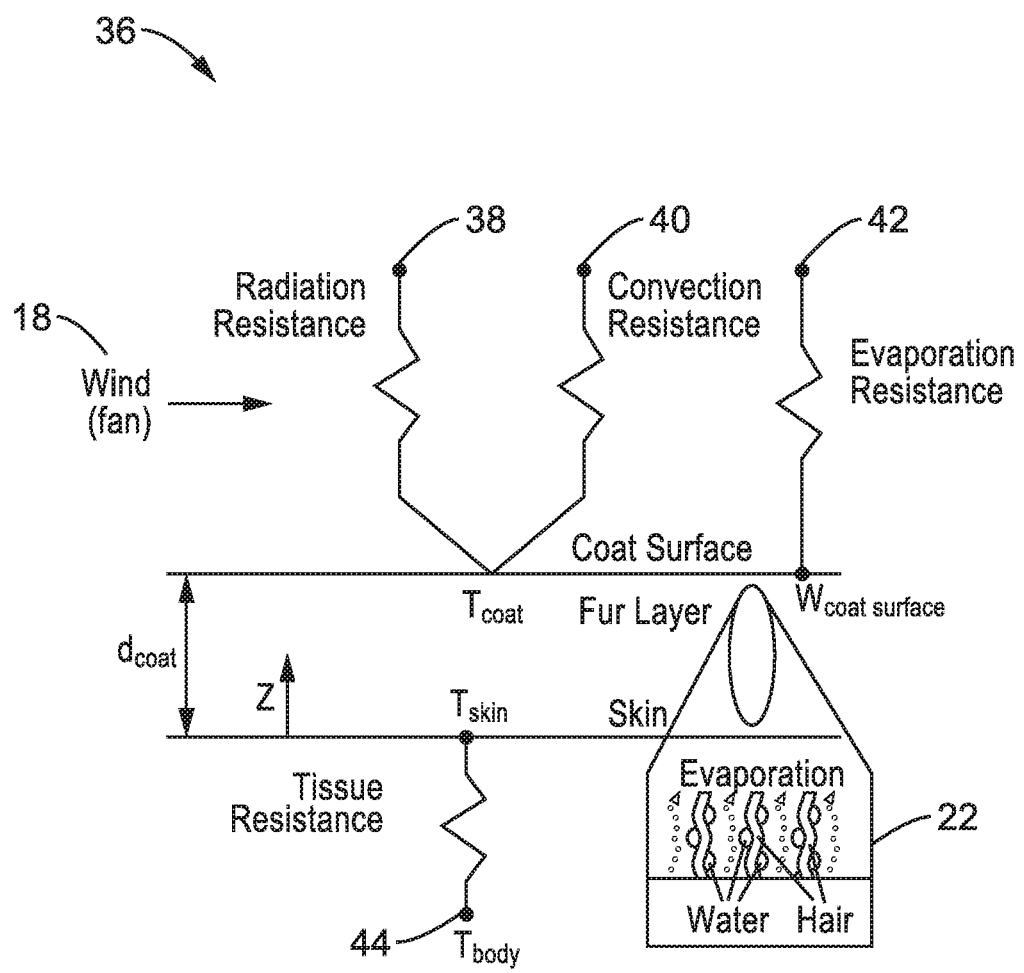
FIG. 2 is a schematic system diagram of heat and mass transfer in a patch of wet fur.

The system controller 24 also controls the fan speed 18 to provide air speeds to the coat surfaces of the fur layer as illustrated in FIG. 2. Since convective heat transfer within the fur layer is minimal for air speeds up to approximately 4 m/s, wind penetration into the fur layer is neglected and heat and mass transfer through the coat are assumed to be governed solely by diffusion. The hair segments in the fur layer 22 as well as the assumed water distribution are shown in inset picture in FIG. 2. Water is assumed to be distributed on the hair rather than at the skin surface for the purposes of modeling the forced evaporation process. The 3 mm value of coat thickness used by the model is on the lower end of the range reported in the literature, which implicitly accounts for some compression of the fur layer during wetting. Sensible heat transfer between the water spray and the cow is minimal relative to the latent heat associated with evaporation, even when the water is quite cool. For example, the latent heat associated with evaporating a given sample of water is over 40 times the sensible heat associated with heating the same water from 25° C. to 38.7° C., the normal core temperature of the cow. Accordingly, the spray cooling process is dominated by evaporation.

The core temperature is assumed to be constant at $T_{core}$ (of 38.7° C.), connected to the skin via a thermal resistance $R''_{tissue}$ (thermal resistance to the flux of heat of the tissue layer in m²KW⁻¹), which is taken to be a constant at 0.0585 W m⁻¹ K⁻¹. This combination accounts for metabolic heat production and the associated heat flow from body core to skin surface.

As the coat dries, water evaporates from the hair surfaces and heat and mass simultaneously diffuse through the fur layer to the coat surface, where they convect away from the cow by the air flow of speed ($u_o$), temperature ($T_{air}$), and water mass fraction ($m_{H_2O,air}$) Within the fur layer, the one-dimensional transient differential energy equation takes the form:

$$\rho c_p \frac{\partial T}{\partial t} = k_{eff} \frac{\partial^2 T}{\partial z^2} - n''_{evap,hair} h_{fg} \beta_{hair}$$

where the term on the left side of the equation represents the time rate of change of moist air temperature, the first term on the right side of the equation represents heat diffusion through the hair layer and the second term represents the sink of heat from air that is used for evaporation. In the second term, $h_{fg}$ represents the latent heat of vaporization of water (J kg⁻¹) and $\beta_{hair}$ is an evaporation correction factor described below. The density and specific heat capacity values are taken to be that of air. The thermal conductivity is based on estimated effective values. The term $n''_{evap,hair}$ in the equation represents a water vapor mass flux in kg m⁻² s⁻¹ due to the evaporation of water droplets on the hair. This term is obtained from application of Fick's law of diffusion to represent evaporation in the radial direction from a strand of hair to the air surrounding it, $$n''_{evap,hair}(z) = \frac{\rho_{air} \mathcal{D}_{air-H2O}(\pi d_{hair} dz) \varrho_{hair}}{r_i \ln(r_i/r_o)} (m_{H_2O}(z) - m_{H_2O,sat}(z))$$

where $\mathcal{D}_{air-H2O}$ is the diffusion coefficient of water vapor in air, $d_{hair}$ is the diameter of hair (0.0464×10⁻³ m), $\varrho_{hair}$ is the area density of hair on the skin (26×10⁶ hairs/m²), $r_i$ is the inner radius of the domain for radial mass transfer from water on the hair (given by $d_{hair}$/2), and $r_o$ is the outer radius for radial mass transfer, which is one half of the distance between adjacent hairs. The local mass fraction of water is denoted as $m_{H_2O}(z)$ and the water at the hair surface is assumed to exist at its saturation value, $m_{H_2O,sat}(z)$. The saturation value of mass fraction is obtained from psychrometric relations from the saturation vapor pressure evaluated at the temperature at the particular z location, $p_{sat}$, $$m_{H_2O,sat} = \left(\frac{M_{water}}{M_{air}}\right)\left(\frac{p_{sat}}{p_{air}}\right) = 3.7494 \times 10^{-3} \exp\left(\frac{17.2694\ T}{T + 238.3}\right).$$

Since the source term in the differential energy equation is dependent on mass fraction, the water species mass balance in the fur layer needs to be solved simultaneously, $$\frac{\partial m_{H_2O}}{\partial t} = \mathcal{D}_{air-H2O} \frac{\partial^2 m_{H_2O}}{\partial z^2} + \beta_{hair} n''_{evap,hair}.$$

In this equation, the first term on the left side represents the transient change in water vapor mass fraction while the first term on the right side represents species diffusion in the z-direction, and the second term represents a source of water vapor generation rate due to evaporation of water droplets from the hair into the air within the coat layer.

When the sprinkler distributes water throughout the coat, water will generally collect in droplets rather than evenly coating the entire lateral surface of each hair as depicted in the inset picture in FIG. 2. As a consequence, the actual area available for evaporation is less than the total lateral area of the hair. To model this effect, an "evaporation correction factor," $\beta_{hair}$, is preferably used which scales the area available for evaporation relative to the ideal case of a completely wet hair surface. A value of $\beta_{hair}=1$ indicates that the entire lateral surface of each hair is wet and available for evaporation.

It is unrealistic to assume that $\beta_{hair}$ is a constant since there is no replenishment of water when the sprayer is turned off. The available area for evaporation is therefore modelled as a function of local water content, with a positive correlation between these two variables: when the fur is very wet, water is more likely to spread over a larger area and consequently cover more of the hair surface. Since each node generally has a different water content at any given time, $\beta_{hair}$ values are a function of spatial location, $$\beta_{hair}(z) = C_{area\ hair} m''_w(z)$$

where the constant $C_{area\ hair}$ is calibrated against the initial water content from literature. If it is assumed that $\beta_{hair}$ attains a maximum value of unity when the overall fur water content is $m''_{w,i\ overall}=0.1867$ kg/m², the constant $C_{area\ hair}$ can be determined as $C_{area\ hair}=(m''_{w,i,overall})^{-1}$.

The spray impingement process during wetting of the cowhide is highly complex and has been difficult to model analytically. Moreover, previous studies suggest that details of the wetting process such as droplet size and distribution of water throughout the depth of the coat may have little to no effect on cooling efficacy. Therefore, a simulation of the drying process from the point when the spray is turned off. The wetting period is preferably treated in an idealized manner in order to obtain the initial conditions for the drying period simulations. The initial amount of water in the fur layer is assumed to be known and is assumed to be distributed uniformly in the depth. The initial fur water content can be estimated from empirical data.

At the skin surface, the heat transfer rate by conduction from the surface to the surrounding control volume is related to the heat conducted from the core, $$\frac{(T_{core}-T(z=0))}{R''_{tissue}} = q''_{core} = -k_{eff}\frac{\partial T}{\partial z}\bigg|_{z=0}.$$

At the coat surface, heat is transferred by convection and radiation to the roof, $$-k_{eff}\frac{\partial T}{\partial z}\bigg|_{z=d_{coat}} = q''_{conv} + q''_{rad,net}$$

where $q''_{conv}$ and a $q''_{rad,net}$ represent the convective and net radiative heat flux from the coat surface, and are determined by constitutive rate equations described below.

For the water species equation, a zero-mass flux boundary condition is used at the skin surface while a convective boundary condition is imposed at the coat surface, $$-\rho\mathcal{D}_{air-H2O}\frac{\partial m_{H_2O}}{\partial z}\bigg|_{z=d_{coat}} = \frac{(m_{H_2O}(z=d_{coat})-m_{H_2O,air})}{R''_{conv,air,MT}}$$

where the convective mass transfer resistance, $R''_{conv,air,MT}$, is determined using constitutive relations.

For the purpose of determining convective heat and mass transfer coefficients in the preceding equations, the cow is modelled as a horizontal cylinder of diameter $d_{cow}$ with airflow (either by fans or wind) directed in cross flow. Both forced convection (fan or natural wind) as well as free/natural convection are modeled using standard correlations in the literature. The non-dimensional forced convective heat transfer coefficient or Nusselt number, $\overline{Nu_D}$, was based on the following correlation, $$\overline{Nu_{d_{cow}}} = 0.3 + \frac{0.62 Re_{d_{cow}}^{1/2} Pr_{air}^{1/3}}{[1+(0.4/Pr_{air})^{2/3}]^{1/4}}\left\{1+\left(\frac{Re_{d_{cow}}}{282,000}\right)^{5/8}\right\}^{4/5}$$

where $Pr_{air}$ is the Prandtl number of air and $Re_{d_{cow}}$ is the Reynolds number of the cross flow based on the cow diameter, $$Re_{d_{cow}} = \frac{u_0 d_{cow}}{v}.$$

In this equation, $u_o$ is the freestream air speed upstream of the cow and v is the kinematic viscosity of air. The equation is valid for $Re_{d_{cow}}>0.2$, which corresponds to air velocity as low as $u_o>5.8\times10^{-6}$ m/s for a cow diameter, $d_{cow}=0.8$ m.

The convective heat transfer coefficient is determined from the Nusselt number and a correction factor for the areal porosity of the fur, $\varepsilon_s$, $$\overline{h_{d_{cow}}} = \varepsilon_s \frac{\overline{Nu_{d_{cow}}} k}{d_{cow}}.$$

The areal porosity factor was estimated as, $$\varepsilon_s = 1 - \varrho_{hair}\frac{\pi d_{hair}^2}{4}$$

where $\varrho_{hair}$ is the hair density (hairs/m²) and $d_{hair}$ is the diameter of the hair ($0.0464\times10^{-3}$ m).

Since the mass fraction differences are low in this evaporative process, low mass transfer rate theory applies. Accordingly, an analogy between convective heat and mass transfer is used to determine the convective mass transfer coefficient from the heat transfer correlation above by replacing $\overline{Nu_{d_{cow}}}$ with the Sherwood number $\overline{Sh_{d_{cow}}}$ and Pr by the Schmidt number, $SC_{air-H2O}$. For the case of perfectly still air or very low air speeds, natural and mixed convection correlations were used.

Radiation exchange between the cow and the roof of the shade structure is approximated by a "small object in large enclosure" model and estimated as $$q''_{rad,net} = \frac{(T_{(z=d_{coat})} - T_{MRT})}{R''_{rad}}$$

where the radiation resistance $R''_{rad}$ is evaluated as $$R''_{rad} = (\varepsilon_{fur} f_{fur} f_{eff} h_{rad})^{-1}.$$

The radiation heat transfer coefficient, $h_{rad}$ is estimated as $$h_{rad} = \sigma(T_{cs,nominal}+T_{MRT})(T_{cs,nominal}^2+T_{MRT}^2).$$

In order to linearize the radiation model, a fixed radiation heat transfer coefficient is used based on a nominal coat surface temperature, $T_{cs,nominal}$ of 301.15 K. The factors $f_{fur}(=0.956)$ and $f_{eff}(=0.71)$ denote the ratios of fur surface area to the skin surface area and the coefficient of effective radiant view factor, respectively. A radiation analysis, based on a three-body radiation exchange involving the cow, barn roof, and ground, was performed to validate the view factor.

A finite volume method was used to solve the coupled energy and species equations along with the boundary conditions. The coat was divided into M number of differential control volumes and the governing equations for energy and species mass balance were discretized. Prior to solving the algebraic equations, the terms had to be linearized. As discussed earlier, the radiation heat flux term was linearized by assuming a constant radiation transfer coefficient. The saturation equation for water presented was linearized to permit a solution using linear algebra as:

$$m_{H_2O,sat} = \begin{cases} (1.2711 \times 10^{-3})T - 1.23507 \times 10^{-2}; T < 30.67° \text{ C.} \\ (1.7978 \times 10^{-3})T - 2.85042 \times 10^{-2}; T \geq 30.67° \text{ C.} \end{cases}$$

This equation approximates the saturation mass fraction to within 2.2% error in the range of 23° C. to 39° C. An implicit scheme formulation was therefore used such that the resulting set of algebraic equations constituted a relation between the nodal temperatures and mass fractions at the current time step (p+1) and their values at the previous time step, p. The entire set of heat and mass transfer nodal equations was compiled into a single matrix equation of the form $\overline{\overline{A}}\overline{X}=\overline{C}$, where $\overline{\overline{A}}$ represented the coefficient matrix, $\overline{X}$ was a vector of unknowns including both temperature and mass fractions, and $\overline{C}$ was the vector with the following constants:

energy equation at skin surface →
⋮
energy equation at coat surface →
species equation at skin surface →
⋮
species equation at coat surface →

$$\underbrace{\begin{bmatrix} a_{1,1} & \cdots & a_{1,2M} \\ \vdots & \vdots & \vdots \\ a_{M,1} & \cdots & a_{M,2M} \\ a_{M+1,1} & \cdots & a_{M+1,2M} \\ \vdots & \vdots & \vdots \\ a_{2M,1} & \cdots & a_{2M,2M} \end{bmatrix}}_{\overline{\overline{A}}} \underbrace{\begin{bmatrix} T_1^{p+1} \\ \vdots \\ T_M^{p+1} \\ m_{H_2O,1}^{p+1} \\ \vdots \\ m_{H_2O,M}^{p+1} \end{bmatrix}}_{\overline{X}} = \underbrace{\begin{bmatrix} C_1 \\ \vdots \\ C_M \\ C_{M+1} \\ \vdots \\ C_{2M} \end{bmatrix}}_{\overline{C}}$$

Each row in this matrix corresponds to one scalar equation. Rows 1 through M of the matrices corresponded to the heat transfer equations for nodes 1 through M (in that order) and rows M+1 through 2 M correspond to the mass transfer equations for nodes 1 through M. The first M elements of matrix $\overline{X}$ corresponded to nodal temperatures $T_1, T_2, T_3, \ldots, T_{M-1}, T_M$ while the last M elements were the nodal mass fractions $$m_{H_2O,1}, m_{H_2O,2}, m_{H_2O,3}, \ldots m_{H_2O,M-1}, m_{H_2O,M}$$

at time step p+1.

The matrix equations were solved simultaneously using matrix algebra with a constant time step. Repeated solution of the nodal equations at each time step via a while-loop yielded profiles of all nodal temperatures and mass fractions over time. Several other relevant variables such as the evaporative flux from the hair and the water content remaining at each node were also computed. The loop was programmed to terminate once the entire coat had been free of water for the previous 150 iterations.

The mathematical model for the drying period calculation (i.e., time duration after sprinklers are turned off) requires initial conditions for the temperature and mass fraction at each node. In addition, the amount of water present in the coat at the start of the drying period needs to be determined. These initial inputs may be estimated.

Modelling water spray interactions with the cow during the wetting period is also complex. In order to predict the initial temperature and mass fraction in the domain, a simplified wetting period description was adopted. The first step involved running an idealized wetting period simulation that assumes complete wetting of the fur from a dry state to the completely wetted state as a step jump at t=0 s.

For this ideal wetting period, the initial temperature condition was computed based on steady-state conditions with dry fur. The initial mass fraction in the fur was uniform at the mass fraction of water vapor in the ambient air. Liquid water was distributed uniformly through the depth of the coat at a value of 0.075 kg m$^{-2}$. Calibration was performed for a 30 second spray at a range of temperatures and relative humidity values and the resulting average initial water content was 0.0745 kg m$^{-2}$ with a standard deviation of 0.0165 kg m$^{-2}$. Although there was a 22% variation in water content, examination of the detailed calibration data suggested that variations in water content values can be attributed, at least in part, to differences between individual cows: certain animals consistently yielded relatively low or high water content values over multiple data runs. Overall, the estimated initial water content values were relatively consistent over a fairly large range of air temperature, relative humidity, and air speed. Therefore, in the present mathematical model, a fixed initial water content of 0.075 kg m$^{-2}$ can be used. Since the estimate of 0.075 kg m$^{-2}$ referred to the entire thickness of the fur layer, this value was distributed evenly among the M differential control volumes to obtain the water content at each discrete location and thus allow computation of the evaporation correction factor ($\beta_{hair}$).

For the purposes of an ideal wetting period simulation, it was assumed that the water supply is continuously replenished so that the water content stays constant at 0.075 kg m$^{-2}$. This allowed the temperatures and mass fractions to fully settle to steady-state conditions, since the water content did not change with time. It was seen that both the temperatures and mass fractions respond very abruptly to this sudden and idealized step input in water content. After some sudden changes near t=0, the values of temperature and water vapor mass fraction attain steady-state conditions through the depth of the coat within one to two seconds.

Since a spray duration of about 30 seconds is needed to wet the fur, it is reasonable to predict that the temperature and mass fractions will be approximately at the steady-state conditions at the time the water is turned off. Thus, to provide an improved estimate of the initial conditions at the start of drying period, the steady-state temperature and mass fraction distributions obtained from the end of the idealized wetting period simulation run were used.

The derived model can be used to predict the drying time for various outdoor conditions (i.e., dry bulb temperature, humidity, air speed, and roof temperature). It also provides a temporal variation of sensible, evaporative and total heat flux. Simplified correlations from a heat transfer model can be used to predict the resulting heat transfer rate and drying time for the wet cow. The output of the simulation for various parametric runs can also be used in the development of simplified empirical expressions for a controller that determines the spray cycle frequency and air speed and duration for a specified total heat removal from the cow.

In one embodiment, empirical expressions for predicting heat rejection rate and drying time were developed from multiple simulation runs. The drying time and total heat flux rate were correlated to the independent variables by a power law expression, $$Y = a_0 x_1^{a_1} x_2^{a_2} x_3^{a_3} \ldots x_n^{a_n}$$

where Y is the variable of interest (drying time or heat flux rate), $x_1, x_2 \ldots x_n$ represent the varied parameters, and $a_0, a_1, a_2 \ldots$ are constants obtained from a regression analysis. Taking a natural logarithm on both sides of this equation results in the linear multivariate equation, $$ln(Y) = ln\ a_0 + a_1\ ln(x_1) + a_2\ ln(x_2) + a_3\ ln(x_3) \ldots + a_n\ ln(x_n).$$

The next step is to choose appropriate input parameters $(x_1, x_2, x_3, \ldots, x_n)$ based on the physics of the problem to determine their associated coefficients $(a_0, a_1, a_2, a_3, \ldots, a_n)$.

To determine the data pool for correlation development, the ambient parameters, (including temperature, roof temperature, absolute humidity, and air speed), that impact the heat and mass transfer rate were chosen. Since it has been shown that there is little cooling benefit to increasing air speed above 2.5 m/s to 3 m/s, the upper bound on air speed was set to 2.5 m/s. Simulations were conducted for all possible combinations of the parameter variations (6×6×6×5=1080) to obtain the corresponding heat flux and drying times. The value of heat flux was chosen corresponding to the drying time.

Examining the obtained data pool revealed that the minimum heat rejection rate that resulted from selecting a combination of above parameters was in excess of 80 W/m². Extending the lower limit of parameters like $T_{air}$ and $u_0$ to smaller numbers like 15° C. and 0.01 m/s respectively would result in unlikely practical scenarios of outdoor conditions and these conditions were not included in the development of the correlations.

Using the obtained data pool, the multivariate linear expression with the best coefficient of determination ($R^2$) value was determined, while ensuring that all the terms in the expression maintained their statistical significance (p-value<0.05). The resulting expression for drying time prediction was:

$$t_{dry}(s) = 42446.5 T_{air}^{-0.344} T_{mrt}^{-0.433} u_0^{-0.308} m_{air}^{0.213}$$

and the corresponding heat rejection rate was of the form:

$$q''(W/m^2) = 290.3 T_{air}^{-0.235} T_{mrt}^{-0.329} u_0^{0.261} m_{air}^{-0.183}$$

A revised correlation, developed for a reduced outdoor air temperature range of 25° C. to 45° C. results in a drying time expression given as:

$$\text{Dry time}(s) = 34648.2 T_{air}^{-0.352} T_{mrt}^{-0.402} u_0^{-0.317} m_{air}^{0.190}$$

and the corresponding heat flux is given as:

$$q''(W/m^2) = 301.1 T_{air}^{-0.257} T_{mrt}^{-0.295} u_0^{0.250} m_{air}^{-0.173}$$

The mean average error of correlation of these prediction equations relative to the model are 4.9% for drying time and 4.5% heat flux. These correlation predictions are within 10% of the model predictions for the majority of conditions.

The resulting multivariate linear expression can be used to determine the control algorithm. The controller logic uses the multivariate linear expression to select the minimum fan speed necessary to maintain the target heat rejection rate using the heat flux prediction equations above. The drying time under the current ambient conditions and the fan speed would be calculated to determine the required spray frequency. If the maximum fan speed would not provide adequate heat rejection, then the predictive controller would track the accumulated heat load and increase the target heat rejection rate at nighttime until the accumulated heat load is dissipated. For days with mild weather, the controller would determine if spray cooling and fans are needed, or whether adequate heat rejection over the course of the day would occur without use of fans and sprayers.

To implement the adaptive spray cycle in a real-world dairy setting as shown in FIG. 1, in one embodiment, the sensors installed in the barn would measure the outdoor air temperature, mean radiant temperature, and humidity and feed this information to a controller 24 programmed with the calculated correlation of the prediction equations discussed above. Based on the sensor data, the controller would determine the appropriate air speed and spray interval as outlined above and operate fan and sprayers accordingly via a variable-speed motor or single speed motor equipped with a variable speed drive and an on/off solenoid water valve.

In another embodiment, the controller algorithm should be over-designed to ensure adequate cooling across the barn as well as with individual cows. The air speed and spray interval may also be regularly re-calculated over the course of the day to account for changes in outdoor conditions. In one preferred embodiment, the controller will calculate air speed and spray interval continuously throughout the day with intervals of every minute or every few minutes. Because the necessary equipment can be easily integrated into existing fan and sprayer systems, this method can be used without extensive modifications to the dairy facility.

Accordingly, a transient one-dimensional heat and mass transfer model of drying from the fur layer of a dairy cow is provided that incorporates effects of air speed, outdoor air temperature, humidity, and radiation exchange with barn roof. Model outputs include the spatial-temporal variation of temperature and water mass fraction, as well as the convective, radiative, and evaporative heat flux variation with time. Local trends indicate that the coat dries from the outer extremities (i.e., coat surface and skin) to the middle section with progression in time. A sudden increase in temperature was observed when the last remaining moisture in the middle section has evaporated, suggesting that the sprinkler should be activated before the cow's coat is completely dry and free of water. Therefore, the sprinklers may be set by the controller to be actuated when the coat is between about 50% and 100% dry or more preferably between approximately 70% and 80% dry.

Parametric studies illustrated in the examples, indicate that drying time decreases with increase in mean radiant temperature, outdoor air temperature and air speed while it increases with an increase in outdoor humidity. Drying time was shown to be particularly sensitive to air temperature, decreasing by over 30% when air temperature increases from of 25° C. to 40° C. The drying process is less sensitive to the roof temperature, as a 25° C. increase in air temperature decreased the drying time by 16%.

Though sensitivity to air speed is minimal for $u_0$ above 3 m/s, drying time is strongly affected by air speed when $u_0$ is relatively low and in the range achieved by typical fans installed in dairy barns. Consequently, fan speed adjustments can provide a convenient means to adjust the rate of heat dissipation from a cow to a target value.

Since fan power is proportional to the cube of the volumetric flow rate, substantial energy savings may be realized by setting the air speed to the lowest value that provides sufficient cooling. Drying time is also quite sensitive to humidity, increasing nearly three-fold when the ambient water mass fraction increases from zero to 0.025. Substantial water savings may be realized by setting water spray off-time to the lowest value that maintains water in the cow's fur.

The adaptive spray cycle of the system employs temperature and humidity sensors to feed real-time information on outdoor conditions to the system controller as illustrated in FIG. 1. The controller then determines the appropriate air speed and spray interval based on the correlation and actuates the fan and sprinklers accordingly. A savings analysis shown in the examples, based on realistic conditions at a commercial dairy, estimates that the predictive model-based controller can reduce annual electricity and water consumption by 20% and 40%, respectively. This demonstrates that an adaptive sprayer system that matches sprinkler timing and fan speed to current outdoor conditions and accumulated heat loads can improve water use and energy efficiency.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the functionality of the system and methods, detailed spatio-temporal temperature and mass fraction distributions within the coat layer were evaluated to describe the drying profile within the coat. Results from a simulation performed for a mean radiant temperature of 35° C., outdoor air temperature of 34° C., outdoor water mass fraction of 0.01, and fan-induced cross air speed of 3 m/s over the cow are shown in FIG. 3A to FIG. 3C. Temperature and water mass fraction values at different locations within the coat as a function of time are depicted in FIG. 3A and FIG. 3B respectively. At t=0, the temperature and mass fraction distributions are approximately linear throughout most of the coat's depth, with the highest values of both variables found near the skin surface. Due to the positive correlation between temperature and saturation vapor pressure of water, hotter locations in the fur are associated with higher mass fractions indicating that the warm skin surface has a significantly higher mass fraction than the relatively cool coat outer surface. As preliminary validation, these profiles appeared consistent with the assumption of steady-state heat and mass transfer with uniform water distribution as the initial conditions. Several changes subsequently occurred in the temperature and mass fraction distributions as the transient drying process progressed. As seen in FIG. 3A, as the coat dries, the skin and coat surface temperatures gradually increase with time until around t=820 s, at which time there is a sharp rise in both the skin and coat temperatures. The corresponding mass fraction at the skin and coat surface locations indicated a monotonic decrease with time at these locations until it dropped to 0.01 (same as the ambient mass fraction) at t=820 s.

Profiles of temperature and mass fraction at five locations within the coat are also presented in FIG. 3A and FIG. 3B. As seen in FIG. 3A, there is an initial decrease in temperature at intermediate locations within the fur due to a reduction in sensible enthalpy on account of evaporation. At most locations, this decrease is followed by a gradual increase in temperature and a final steep increase at t=820 s. However, at most notably the centerline of the coat at $z=d_{coat}/2$, the temperature decreases until t=820 s, at which point, a sudden increase in temperature occurs. This trend is reflected in FIG. 3B, where the mass fraction profiles show inflexion points corresponding to the temperature profiles. At any time under approximately t=400 s, the spatial mass fraction trend indicates that moisture is driven from the skin towards the surface of the coat. Between about t=400 and 820 seconds, the mass fraction of water from z=0 to $z=d_{coat}/4$ are identical. At $z=d_{coat}/2$, the rate of change of mass fraction is the smallest, resulting in a gradual monotonic change in mass fraction until a time of t=820 s, when a sudden decrease is experienced as the last of the water in the fur layer evaporates. This trend arises since heat penetrates the fur layer from the skin and the external ambient environment, causing these regions to rise in temperature earlier than the middle sections of the coat hair.

The normalized liquid water content in the fur region was plotted in a three-dimensional plot in independent variables t and z. The water content at each node was normalized relative to its initial value. It was observed that the fur dries from the edges inward, with the skin and coat surface drying first and locations near the center line drying last.

FIG. 3C depicts individual contributions of evaporative, convective, and radiative components to the total heat flux dissipated from the coat surface. The sensible heat flux is given by the sum of convective and radiative components of heat transfer. For the particular choice of conditions, the sensible flux is negative, meaning that sensible heat is transferred to the cow rather than dissipated. Note that even though the ambient temperature is lower than the cow's skin temperature, convective heat transfer occurs into the fur since the coat surface temperature is lower than the outdoor air temperature. Similarly, the net radiative heat transfer is into the coat surface, resulting in a negative flux. With an increase in time, the convective and radiative fluxes decrease in magnitude since the coat surface is getting warmer as seen in FIG. 3A. The evaporative flux is quite large relative to the sensible (convective+radiant) flux, starting in excess of 250 $W/m^2$ and decreasing to about 190 $W/m^2$ at t=820 s. This high value confirms the effectiveness of the evaporative cooling. The total (net) heat flux is a combination of the positive evaporative flux and the negative sensible heat flux into the coat layer. This total heat flux should balance the metabolic activity of the cow in order to avoid heat stress. The net heat flux changes more gradually than the evaporative heat flux due to the decreasing negative contributions of the sensible heat gain terms with time. At time t=820 s, when the evaporative heat flux is zero, the skin temperature of the cow is greater than the ambient temperature (see FIG. 3A), resulting in a small but positive contribution of sensible heat flux to heat removal from the cow. However, this small heat flux is unlikely to meet the required heat rejection due to metabolic activity of the cow.

The temporal variation of heat flux components for a case of higher outdoor mass fraction of 0.02, corresponding to a high humidity climate, is shown in FIG. 4. All of other conditions are identical to that found in FIG. 3C with a mean radiant temperature of 35° C., outdoor air temperature of 34° C., and fan-induced cross air speed of 3 m/s over the cow. The total heat flux can be compared against that seen in FIG. 3C for the lower outdoor mass fraction of 0.01. It can be seen that evaporation heat transfer is much less effective due to the lower driving potential for mass transfer at high outdoor humidity.

Figure 3A:
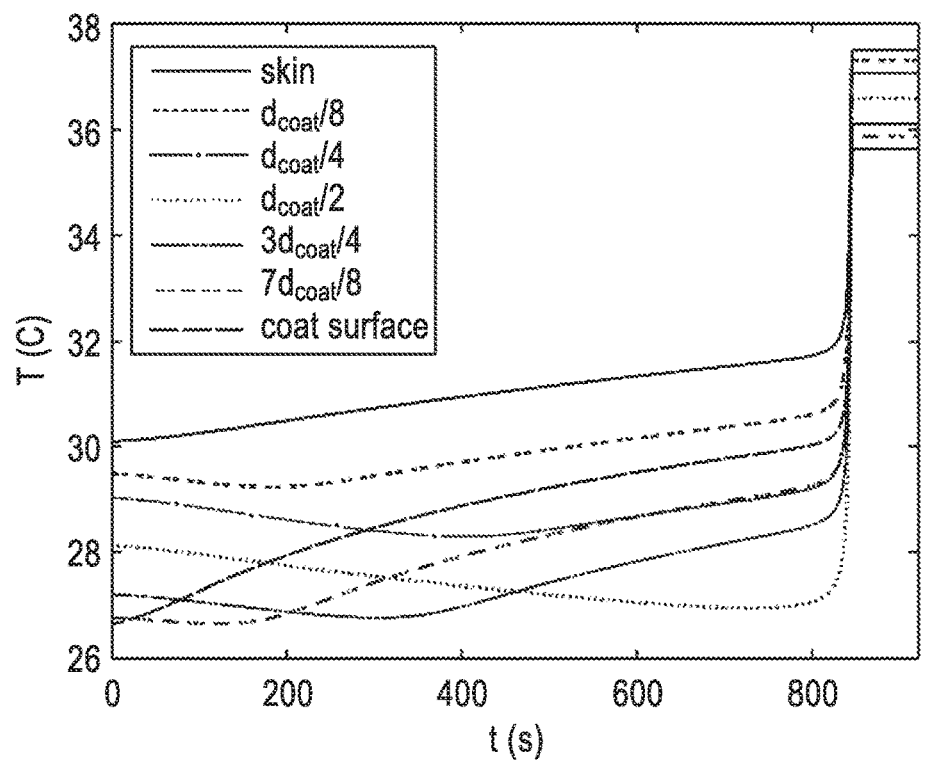
FIG. 3A is a graph of the temporal evolution of temperature at various locations in the fur. Simulation variable values: Mean radiant temperature of 35° C., Outdoor air temperature of 34° C., Outdoor mass fraction of 0.01, Air speed of 3 m/s.
Figure 3B:
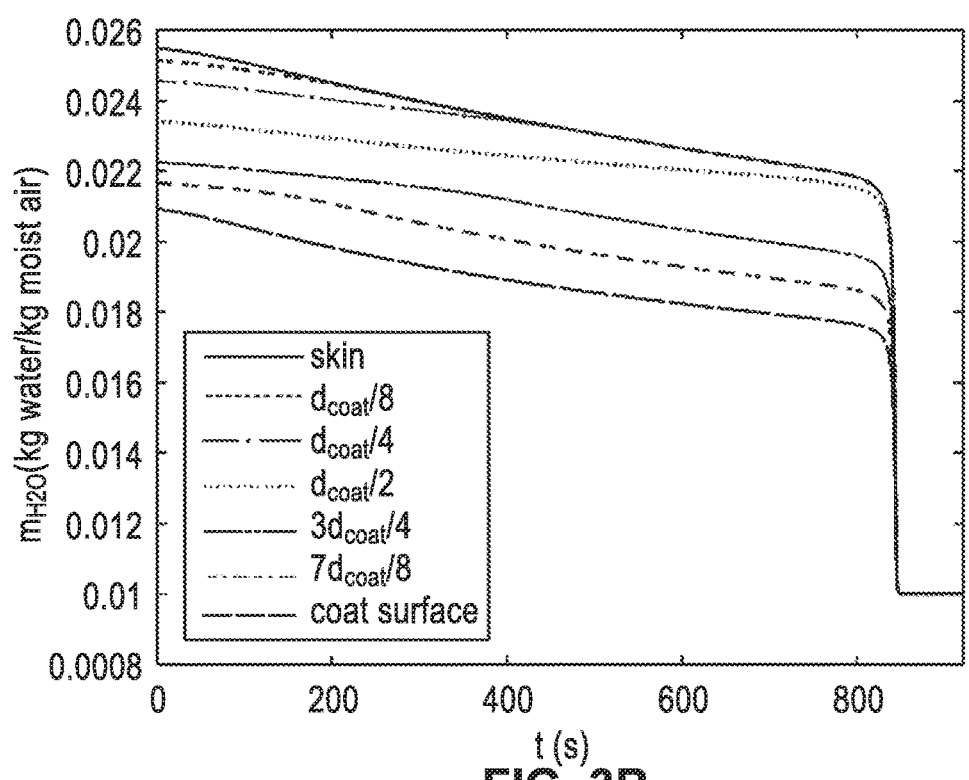
FIG. 3B is a graph of the temporal evolution of mass fraction at various locations in the fur.
Figure 3C:
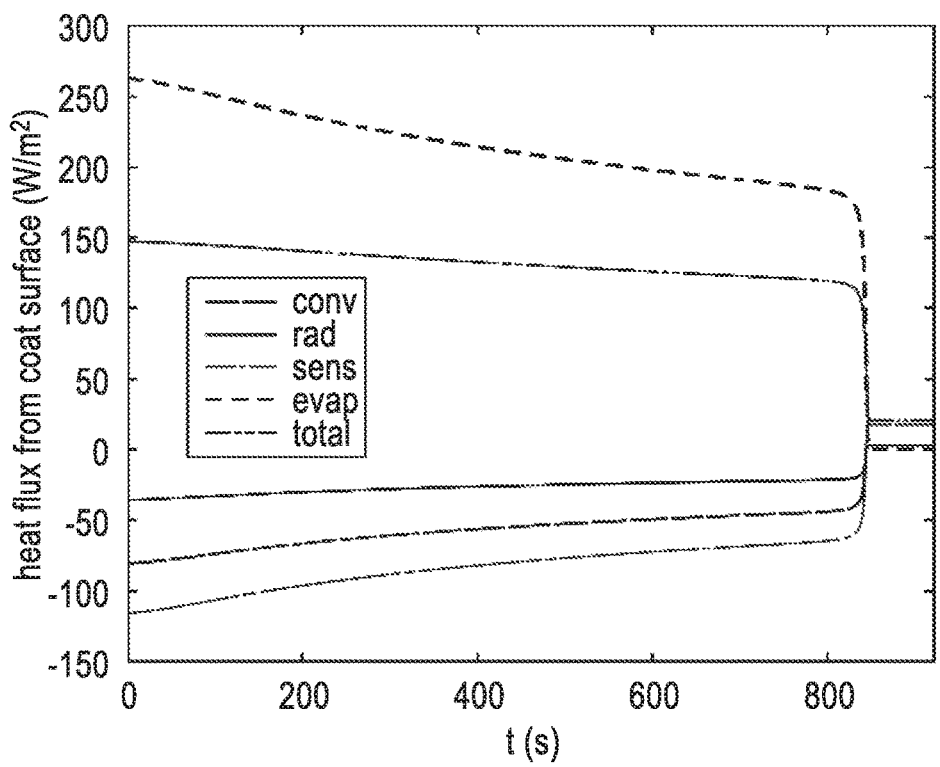
FIG. 3C is a graph of the temporal evolution of heat flux at various locations in the fur.
Figure 4:
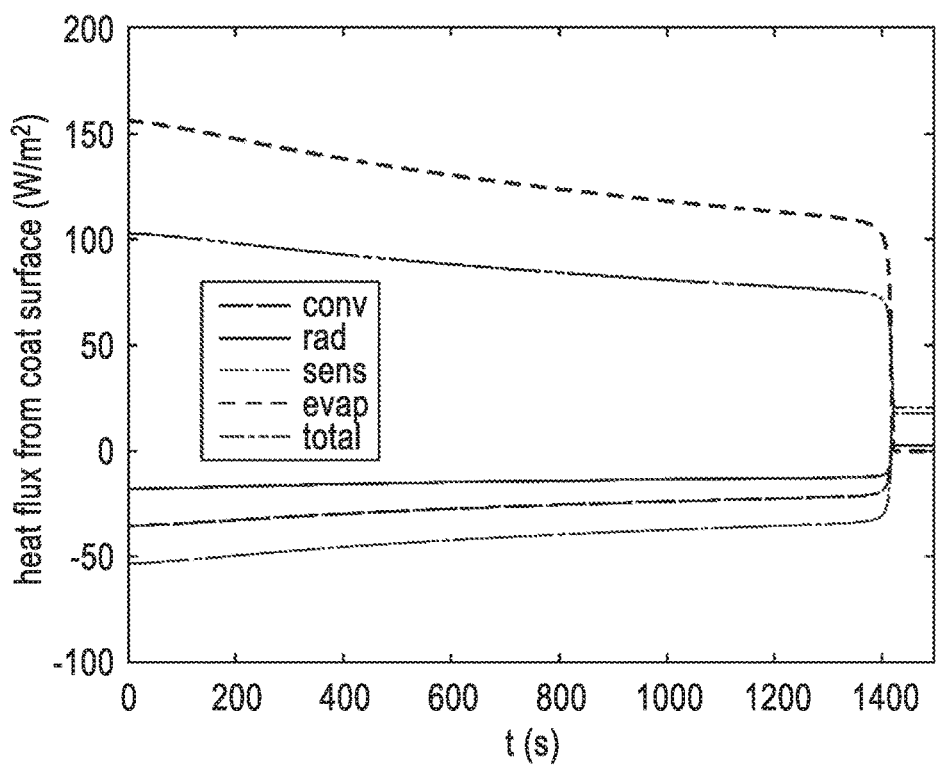
FIG. 4 plots the temporal evolution of heat flux components in a high humidity outdoor condition. Simulation variable values: Mean radiant temperature of 35° C., Outdoor air temperature of 34° C., Outdoor mass fraction of 0.02, Air speed of 3 m/s.

The highest value of evaporative flux is only 150 W/m² compared to 260 W/m² shown in FIG. 3C. Since the convective and radiative temperatures are the same as in FIG. 3, the lower evaporative flux leads to a higher coat surface temperature. The higher surface temperature in turn results in a decrease of sensible heat into the coat. However, the net heat flux is dominated by the decrease in evaporative heat transfer and hence is significantly lower at higher outdoor humidity conditions. When compared against FIG. 3C, it is also clear that the time for complete evaporation is significantly longer under high humidity conditions. This suggests that increasing the fan speed and decreasing the sprayer frequency might be warranted under comparatively high humidity conditions.

Once the simulation was complete, drying time was estimated from the computed data. Since the spatio-temporal variation study indicated that nodal temperatures spike rapidly when the last of the water evaporated, the sprinkler should be activated before all liquid water has evaporated from the coat. Thus, as a reasonable approximation, the fur layer was considered to be dry at 80% of the time to this temperature spike.

Example 2

To assess the effects of changing input parameters, parametric analyses were conducted relative to a baseline condition. $T_{air}$ had a baseline of 34° C. and a range of 25° C. to 40° C. and $T_{MRT}$ had a baseline of 34° C. and a range of 35° C. to 60° C. The $u_0$ parameter had a baseline of 3 m/s and a range of 0 to 4 m/s. The baseline for $m_{H_2O,air}$ was 0.01 and the range was 0.00 to 0.025. When one parameter was varied, all other parameters were retained at their baseline value. Results of drying time and total heat flux variation with the parameter were evaluated.

The range of air speeds was set according to typical air speeds reported in the literature and measurements taken at the location of the cows in a commercial dairy fitted with a fan cooling system. The baseline for $m_{H_2O,air}$ was set based on a hot and dry climate such as that found in the central valley in California. For the air temperature, air speed, and outdoor humidity studies, the mean radiant temperature was set equal to $T_{air}$. For the mean radiant temperature study, $T_{air}$ was held at 34° C. and $T_{MRT}$ was varied over the range of 34° C. to 60° C.

Variation in drying time with outdoor air temperature is shown in FIG. 5A. It is seen that the drying time decreases non-linearly with increase in $T_{air}$. It can be seen that the drying time decreases by over 30% when air temperature increases from 25° C. to 40° C., indicating that the adaptive spray cycle can improve water use efficiency.

FIG. 5B shows the sensible and total heat flux variation with time for two different $T_{air}$ of 25° C. and 40° C. temperatures. As in the spatio-temporal variation example, the sensible heat flux is negative during drying for the chosen set of conditions. When air temperature increases from 25° C. to 40° C., the sensible heat flux changes from a relatively small negative value (indicating a low rate of sensible heat transfer into the coat surface) to a much larger negative value (indicating a higher rate of sensible heat transfer to the coat). The total heat flux from the coat surface remains positive, indicating that the outgoing evaporative flux still exceeds the incoming sensible flux. However, since the total flux decreases significantly with increased temperature (over 26% drop at t=0), the cooling effect is diminished. In this case, it may be advisable to increase the fan speed (discussed in more detail later) to promote evaporation and thereby maintain a high heat rejection rate. The results in FIG. 5A and FIG. 5B demonstrate that the spray cycle frequency can be decreased early in the day when air temperature is fairly low, thereby reducing water consumption. As air temperature rises over the course of the day and drying time decreases, the spray frequency may be increased accordingly.

The variation of drying time with crossflow air speed is shown in FIG. 6A. It should be noted that three different convection correlations were used to obtain in the drying rate from simulations. These corresponded to free convection for $u_o$=0 m/s, mixed convection for $u_o$=0.25 m/s, and forced convection for $u_o$≥0.5 m/s.

From FIG. 6A, it can be seen that drying time decreases significantly and in a non-linear fashion from 1800 s at zero air speed (natural convection) to about 650 s for an air speed of 3.5 m/s. The total heat flux variation with time for different air speeds is shown in FIG. 6B. The total heat flux (and hence cooling) is increased significantly by increasing the air flow over the cow. For example, at t=400 s, the total heat flux increases from 90 W/m$^2$ at $u_o$ of 0.5 m/s to 140 W/m$^2$ at $u_o$ of 4 m/s. Two contrasting trends cause the overall resultant trend in total heat flux. With increased air speed, the convective heat gain (negative flux) into the fur layer increases. However, the evaporation heat loss flux (positive flux), fueled by the increased sensible heat addition to the fur, also increases since a given amount of water in the fur evaporates in a shorter time. The latter flux is much more significant, thereby resulting in an increase in total heat loss flux.

FIG. 6A shows that the variation of drying time with air speed is strongly non-linear. This is a consequence of the heat transfer model, in which the cow rejects body heat through a set of three thermal resistances in series (tissue resistance, fur layer conductive resistance, and convective resistance). At low $u_o$, drying time and total heat flux are highly sensitive to changes in air speed since heat dissipation is limited mainly by the convective resistance between the coat surface and air stream. However, at higher $u_o$, drying time and total heat flux are much less sensitive to changes in air speed since the conductive resistance of the body core and fur layer dominates the overall resistance to heat transfer. In particular, based on the plots of FIG. 6B, there is little cooling benefit to increasing $u_o$ beyond about 3 m/s. This aspect is evident when comparing the total heat flux variation for $u_o$ of 3 m/s and 4 m/s. The total heat flux curve corresponding to air speed of 4 m/s is only slightly higher than the curve corresponding to 3 m/s.

A review of literature demonstrates that air speeds in the range of 0.5 m/s to 3 m/s are typical for evaporative cooling of cows. Since fan power increases as the cube of the volumetric flow rate, higher fan speeds that are required to produce a greater air speed over the cow can drastically increase energy consumption. Consequently, it is necessary to choose the air speed and corresponding fan settings to balance both cooling and energy efficiency considerations. The preferred approach employed in the controller algorithm is to use the lowest fan speed that keeps the cow's rate of heat dissipation above a given minimum value. Trends in the parametric variations with $T_{air}$ and $u_o$ corroborate experimental observations that air temperature and air speed affect evaporation rates significantly.

The variation of drying time with outdoor air water mass fraction is shown in FIG. 7A. Consistent with expectations, drying progresses rapidly in dry conditions and more gradually in humid climates. Variation of total flux with time is shown in FIG. 7B. At low humidity, the evaporative heat flux is very large due to the significant humidity differential between the coat surface and the ambient level. The total heat flux dissipated from the coat is also very high, which confirms the effectiveness of evaporative cooling. As the mass fraction of water increases from 0 to 0.025, the evaporative and total fluxes decrease substantially (71% and 59% drop, respectively, at t=0). The sensible heat flux, given by the difference between total flux and evaporative flux, is a very large negative at low humidity and a smaller negative at higher humidity. This indicates that evaporation cools the coat surface below the outdoor air temperature for both choices of conditions; the coat surface temperature decreases with lower ambient humidity due to the increased evaporation rates.

Figure 7A:
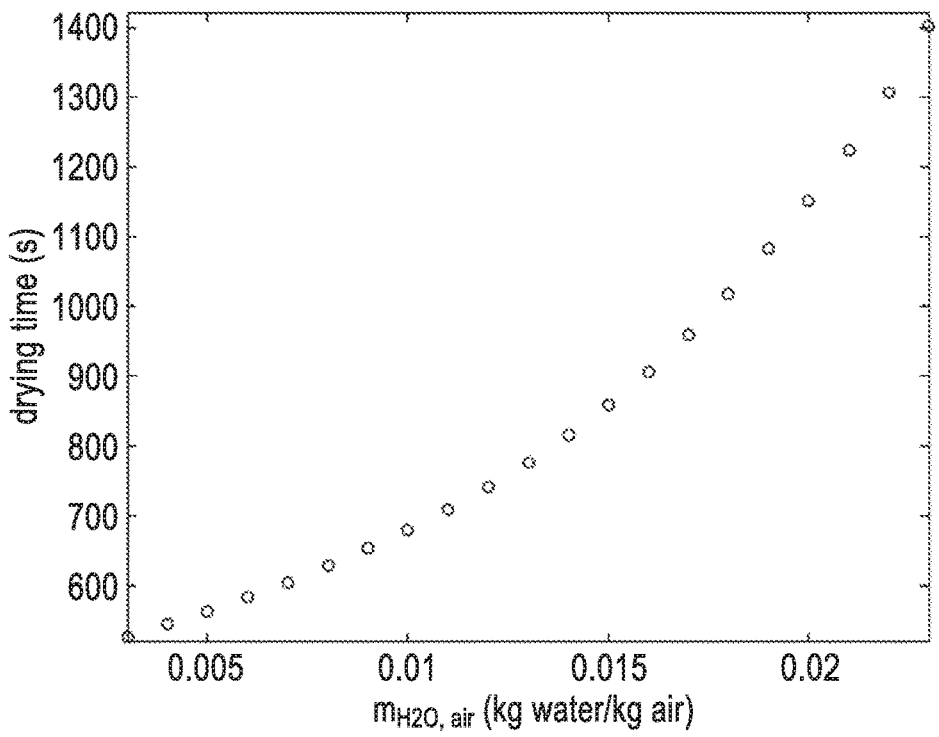
FIG. 7A is a plot of parametric variation of outdoor air water mass fraction and drying time.
Figure 7B:
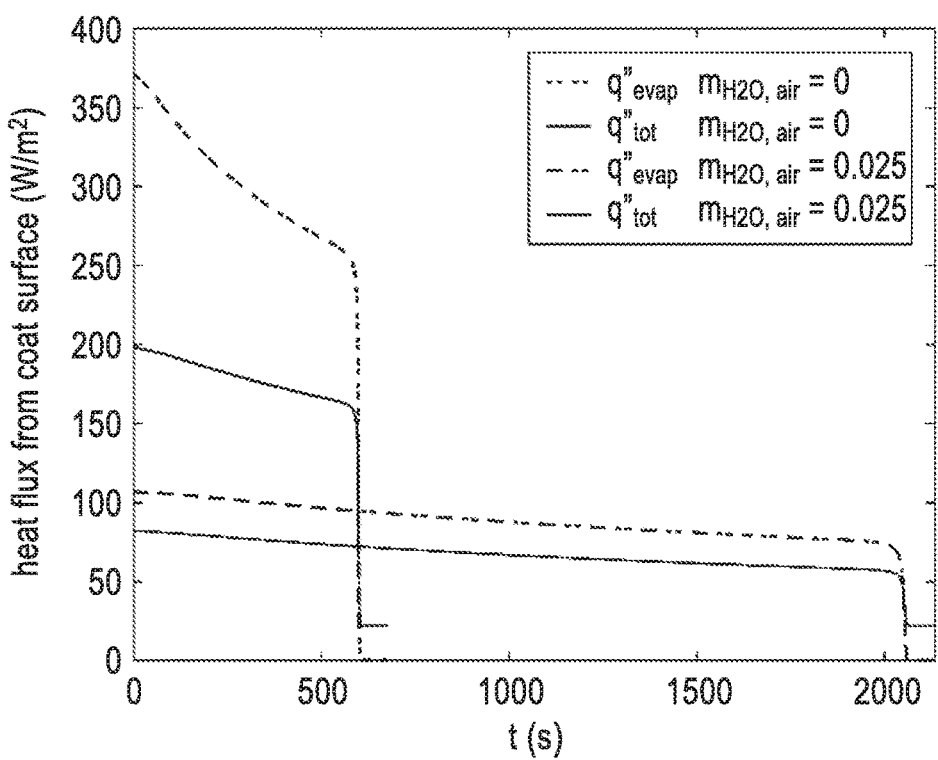
FIG. 7B is a plot of parametric variation of outdoor air water mass fraction and evaporative and total heat flux with time for $m_{H_2O,air}$ of 0 and 0.025.

It can be concluded from the drying time and total heat flux plots in FIG. 7A and FIG. 7B that evaporative cooling may be best suited to moderately dry regions. In extremely dry climates, rapid evaporation consumes large quantities of water, while in highly humid conditions the slower evaporation may not maintain adequate cooling. In such cases, fan speed adjustments may be particularly useful. Specifically, fan speed may be decreased in dry conditions to prolong the drying process and thereby conserve water; similarly, fan speed may be increased in moist conditions to speed drying and improve cooling efficacy.

Figure 8A:
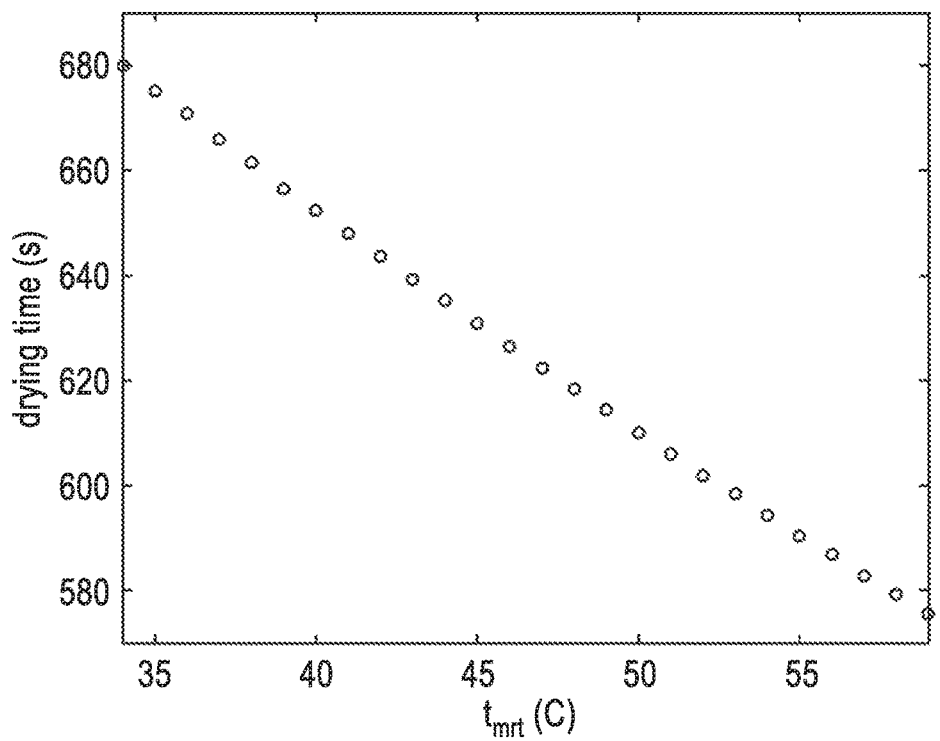
FIG. 8A is a plot of parametric variation of mean radiant temperature and drying time.
Figure 8B:
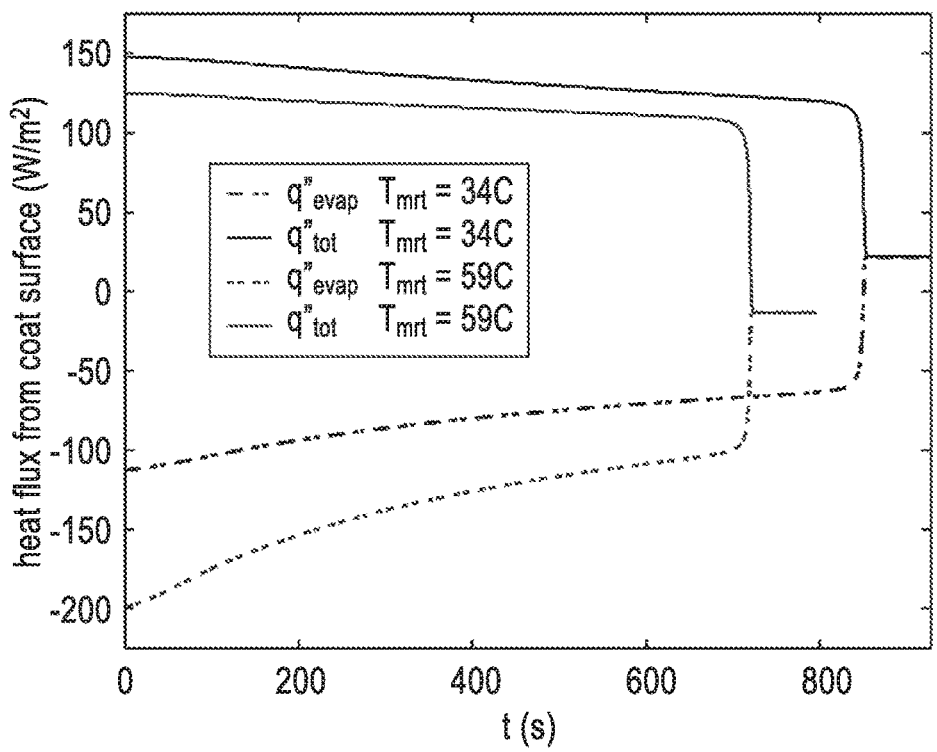
FIG. 8B is a plot of parametric variation of mean radiant temperature and sensible and total heat flux with time for $T_{MRT}$ of 34° C. and 59° C.

The variation of drying time with $T_{MRT}$ is shown in FIG. 8A. Consistent with expectations, drying time decreases monotonically by over 15% when the roof temperature is increased from the baseline of 34° C. to 59° C. (25 degrees higher than baseline). FIG. 8B shows the sensible and total flux variation with time for $T_{MRT}$ of 34° C. and 59° C. As seen from FIG. 8B, the sensible heat flux increases rapidly for $T_{MRT}$ of 59° C. causing the evaporative heat flux rate to increase thereby decreasing the drying time. Though the evaporative flux increases at high roof temperature, the sensible flux decreases by a greater amount so that the total flux overall decreases. With all other conditions remaining unchanged, a reduction in roof temperature in dairies would reduce evaporative flux as well as the heat load on the cow and therefore improve water efficiency. In one embodiment, to lower its temperature, the upper surface of the feed bunk roof is painted with a solar reflective white coating that has a high solar reflective index and high emissivity to infrared radiation.

Figure 5A:
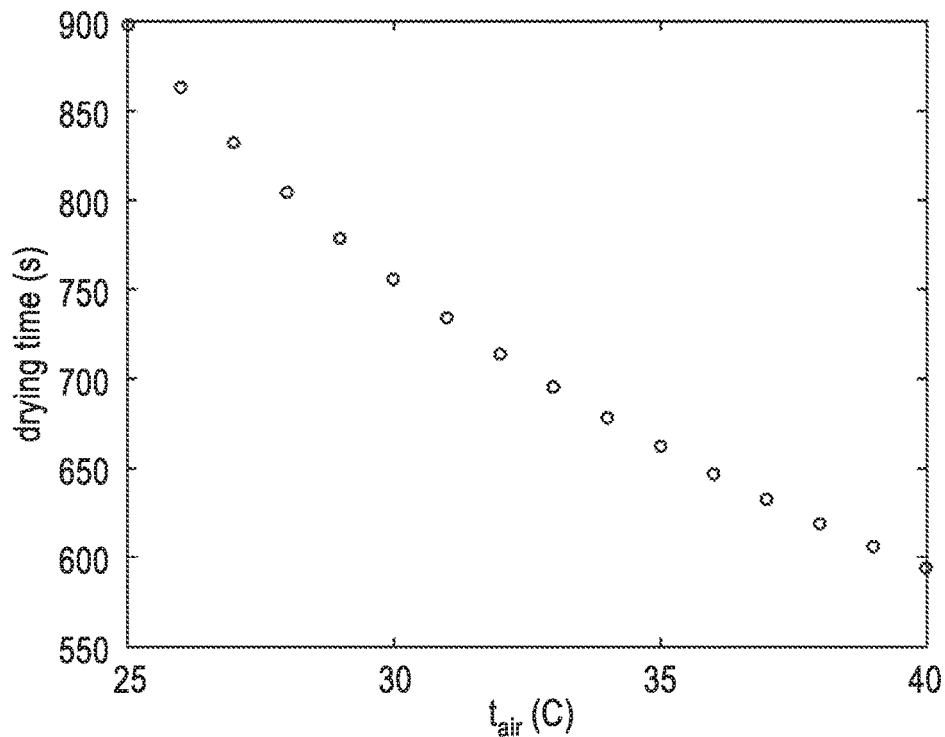
FIG. 5A is a graph of parametric variation of outdoor air temperature and drying time.
Figure 5B:
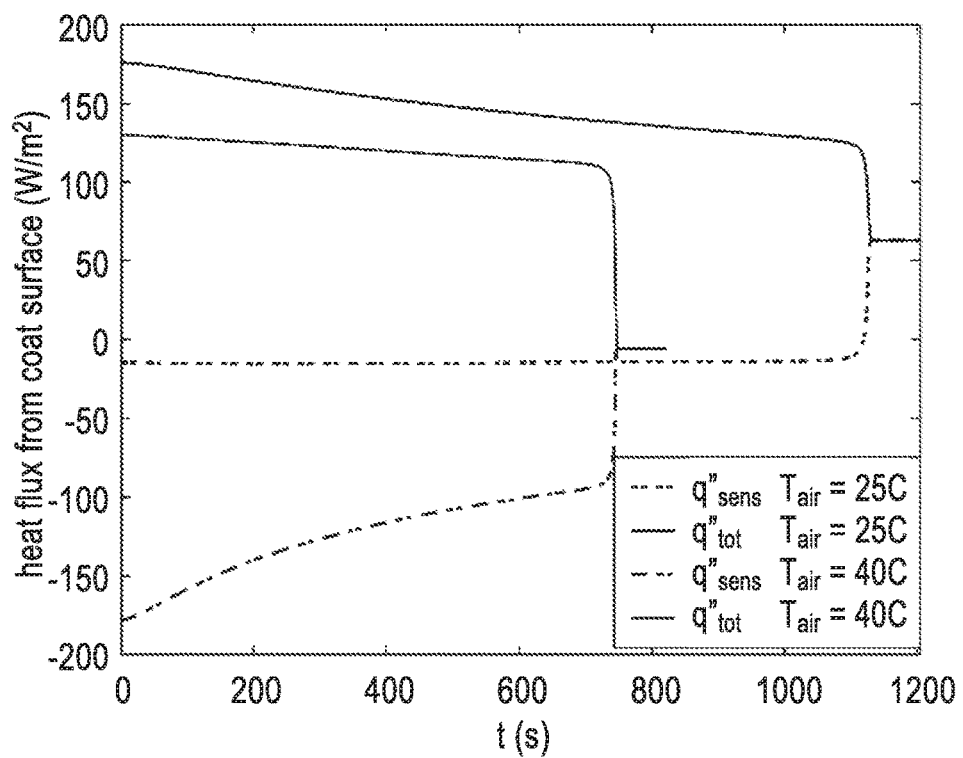
FIG. 5B is a graph of parametric variation of outdoor air temperature and sensible and total heat flux with time for $T_{air}$ of 25° C. and 40° C.
Figure 6A:
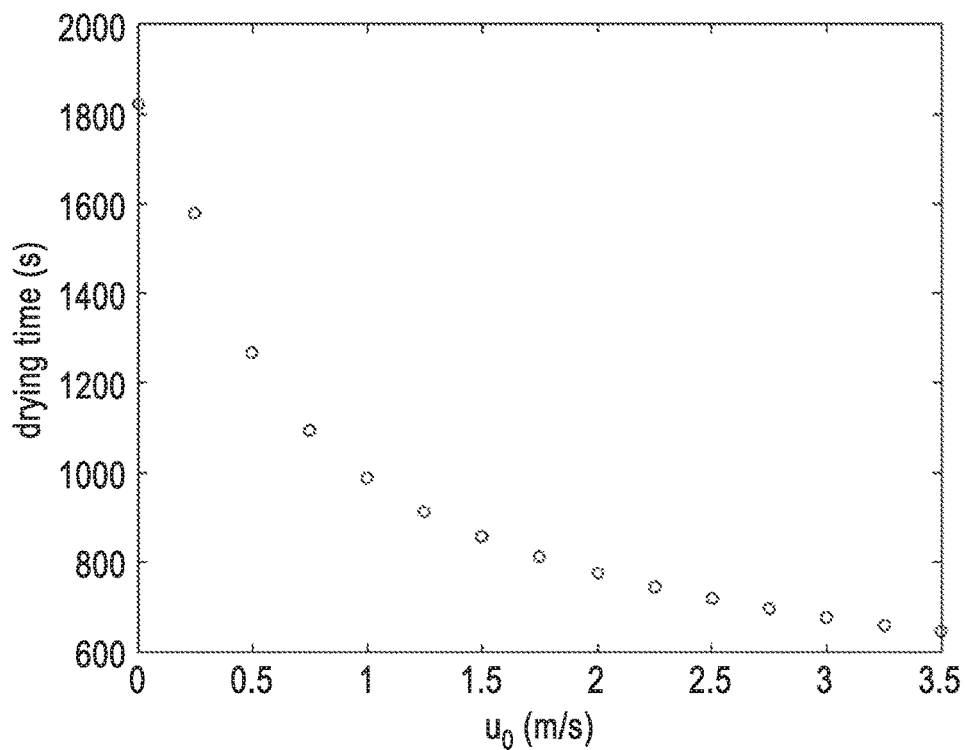
FIG. 6A is a plot of parametric variation of crossflow air speed and drying time.
Figure 6B:
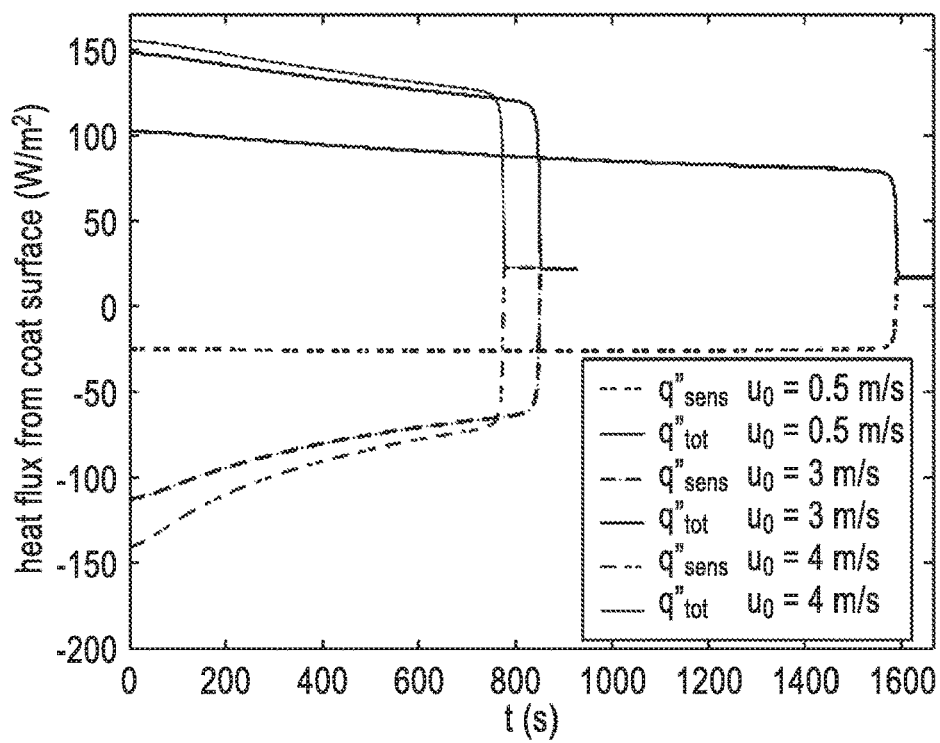
FIG. 6B is a plot of parametric variation of crossflow air speed and sensible and total heat flux with time for air speeds ranging from 0.5 m/s to 4 m/s.

Overall, changes in the surrounding temperature of the environment produce the same general effect as changes in air temperature, as the trends shown in FIG. 8B essentially mirror those of FIG. 5B. However, the total heat flux is considerably less sensitive to the surrounding roof temperature than the air temperature. For example, a 25° C. increase in roof temperature produces a 16% decrease in the total heat flux at t=0, while a 15° C. increase in air temperature produces a 26% decrease in the total flux.

Example 3

To assess the potential energy and water savings of the predictive model-based controller, heat flows from a cow were estimated. A heat gain of 210 $Wm^{-2}$ from retained energy from daily food intake, a 90 W $m^{-2}$ heat loss due to respiration, and 12 $Wm^{-2}$ of heat loss due to water intake, assuming that 25 kg $d^{-1}$ water that is 15° C. below the body temperature of the cow is consumed. This results in a 108 W $m^{-2}$ of net heat flux that must be dissipated to the environment for the cow to remain in thermal equilibrium.

The performance of the model-based correlation was compared to a controller operating at a dairy farm in Tulare County, which is the highest milk producing county in California. The air velocity in the barn was measured with the fans operating at full speed, and the relationship between air velocity, fan speed, and power was calculated using fan affinity laws.

In this example, a high temperature of 35° C. and absolute humidity between 0.07 to 0.08 was used to compare how fans and sprayers operate under both the baseline controller and the predictive controller. When the outside temperature was at least 21.1° C., the baseline controller turned on the fans to full speed and turned on the water spray to operate for 1 min on/4 min off (20% on-time). When the temperature exceeded 32.2° C., the water spray frequency increased to operate for 1 min on/2 min off (33% on time).

The spray-cooling model calculated that the baseline and the controller was set to deliver cooling in excess of the required 108 W $m^{-2}$ for the cow in the morning and evening, demonstrating that there is an opportunity to save both electricity and water. The model-based correlation controller calculated the optimal fan and water spray operation to ensure the required cooling load for the dairy cows is met while minimizing use of electricity and water. For the same example day, the fan speed was reduced to maintain the cooling required (108 $Wm^{-2}$) close to 100%, decreasing electricity use by 25%. The frequency of water spray required was calculated so that water was not wasted. In the middle of the day, both the baseline and model-based correlation controllers delivered the same amount of cooling, but the latter did so with approximately half the water. This is because the model-based correlation controller delivered only the amount of water needed to achieve the cooling rate, but no more once the ability of the cattle fur to retain and evaporate water had been reached.

In addition, the predictive controller was estimated to reduce electricity consumption by 25% and water use by 50% by reducing the fan speed and spray frequencies, respectively. Over an entire year, the estimated electricity and water savings for this example were predicted to be 20% and 40%, respectively. These findings demonstrate that an adaptive model-based predictive controller sprayer system that matches sprinkler timing and fan speed to current outdoor conditions can greatly improve water use and energy efficiency and sustainability in the dairy industry.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for controlling cooling of livestock, the apparatus comprising: (a) one or more input sensors selected from the group of sensors consisting of an air temperature sensor, a humidity sensor, a wind speed sensor, and a surrounding surface temperature sensor; (b) a processor configured to receive input from one or more of the input sensors; (c) a non-transitory memory storing instructions executable by the processor; and (d) a non-transitory memory storing a control algorithm that can be read by the processor; (e) wherein the instructions, when executed by the processor, perform one or more steps comprising: (i) using input from the one or more input sensors and the control algorithm, predicting heat transfer rate and drying time for a wet livestock; (ii) using the predicted heat transfer rate to control speed of a fan blowing air over livestock sprayed with water to ensure that a minimum cooling rate for the livestock is maintained; and (iii) using the predicted drying time to control frequency of the water spray to ensure that that the livestock is cooled without using more than water than is required to maintain the minimum cooling rate.

2. The apparatus of any preceding or following embodiment, wherein the instructions when executed by the processor further perform one or more steps comprising calculating cumulative heat rejection rates over time and using weather forecast data to control the fan and water spray.

3. The apparatus of any preceding or following embodiment, wherein the instructions comprise a control algorithm based on heat transfer rates and drying times calculated from best-fit correlations derived from a heat transfer model.

4. The apparatus of any preceding or following embodiment, wherein the control algorithm comprises a lookup table or set of equations that select fan speed and water spray interval based on input from the one or more input sensors.

5. An apparatus for controlling water cooling of livestock, the apparatus comprising: (a) at least one fan with a fan speed producing an airflow; (b) at least one water sprayer with a flow rate; (c) one or more input sensors selected from the group of sensors consisting of a temperature sensor, a humidity sensor, a wind speed sensor, and a surrounding surface temperature sensor; (d) a controller with a processor configured to receive input from one or more of the input sensors and produce output control signals to the fan and the sprayer; and (e) a non-transitory memory storing instructions executable by the processor; (f) wherein the instructions, when executed by the processor, perform one or more steps comprising: (i) acquiring sensor data from the one or more input sensors; (ii) predicting a heat transfer rate and drying time of a subject from the sensor data; (iii) controlling sprayer actuation and sprayer duration to wet the subject; and (iv) controlling fan speed and airflow over a subject to transfer heat from the subject.

6. The apparatus of any preceding or following embodiment, further comprising: a proximity sensor operably connected to the controller processor; wherein output control signals from the processor are not sent to the sprayer and fan unless the proximity sensor input indicates the proximity of the subject.

7. The apparatus of any preceding or following embodiment, wherein the instructions when executed by the controller processor further perform steps comprising: calculating a minimum cooling rate; and increasing or decreasing the fan speed over time to ensure that the calculated minimum cooling rate for the subject is maintained.

8. The apparatus of any preceding or following embodiment, wherein the instructions when executed by the controller processor further perform steps comprising: predicting a drying time for the subject; and matching a spray off time to the predicted drying time that corresponds to the current outdoor environmental conditions.

9. The apparatus of any preceding or following embodiment, wherein the spray off time is matched with a selected percentage of the predicted drying time in the range of 50% to 100% of the predicted time.

10. The apparatus of any preceding or following embodiment, wherein the drying time of the subject is predicted as a function of outdoor air temperature, air speed, humidity, and mean radiant temperature.

11. The apparatus of any preceding or following embodiment, wherein the instructions when executed by the processor further perform one or more steps comprising: calculating cumulative heat rejection rates over time; and using weather forecast data to control the fan speed and water spray.

12. The apparatus of any preceding or following embodiment, wherein the instructions when executed by the processor further perform one or more steps comprising: calculating cumulative heat rejection rates over time; calculating acquired heat load over time; and using calculated heat load and rejection rates to control the fan speed and water spray frequency.

13. The apparatus of any preceding or following embodiment, wherein the instructions comprise a control algorithm based on heat transfer rates and drying times calculated from best-fit correlations derived from a heat transfer model.

14. The apparatus of any preceding or following embodiment, wherein the control algorithm comprises a lookup table or set of equations that select fan speed and water spray interval based on input from the one or more input sensors.

15. The apparatus of any preceding or following embodiment, wherein the instructions when executed by the controller processor further perform steps comprising: receiving sensor inputs at regular intervals; recalculating heat transfer rate and drying time at each interval; and modifying fan air speed and spray intervals from the recalculated heat transfer rate and drying time; wherein modifications of fan air speed and spray intervals over the course of the day accounts for changes in outdoor conditions.

16. A method for controlling heat stress in livestock, the method comprising: (a) providing outdoor air temperature, air speed, humidity, and mean radiant temperature sensor data; (b) predicting a heat rejection rate and drying time for a wet livestock from the sensor input; (c) calculating a cooling load threshold from the rejection rate and drying time; and (d) determining fan speed and sprinkler operation frequency needed to meet the cooling load threshold given the outdoor sensor data.

17. The method of any preceding or following embodiment, further comprising: creating a one-dimensional simultaneous heat and mass transfer model of evaporation within wetted fur configured to estimate drying time and heat rejection rate based on ambient condition sensor data; and calculating the cooling load threshold from the rejection rate and drying time estimated by the model.

18. The method of any preceding or following embodiment, further comprising: calculating a minimum cooling rate; and increasing or decreasing the fan speed over time to ensure that the minimum cooling rate for the livestock is maintained.

19. The method of any preceding or following embodiment, further comprising: predicting a drying time for the livestock; and matching a spray off time to the predicted drying time that corresponds to the current outdoor environmental conditions.

20. The method of any preceding or following embodiment, wherein the spray off time is matched with a selected percentage of the predicted drying time in the range of 50% to 100% of the predicted time.

21. The method of any preceding or following embodiment, further comprising: receiving sensor inputs at regular intervals; recalculating heat transfer rate and drying time at each interval; and modifying fan air speed and spray intervals from the recalculated heat transfer rate and drying time; wherein modifications of fan air speed and spray intervals over the course of the day accounts for frequently changing outdoor conditions.

22. The method of any preceding or following embodiment, further comprising: receiving sensor inputs at regular intervals; calculating cumulative heat rejection rates over time; calculating acquired heat load over time; and using calculated heat load and rejection rates to control the fan speed and water spray frequency.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for controlling cooling of livestock, the apparatus comprising:
   (a) one or more input sensors selected from the group of sensors consisting of an air temperature sensor, a humidity sensor, a wind speed sensor, and a surrounding surface temperature sensor;
   (b) a processor configured to receive input from one or more of said input sensors;
   (c) a non-transitory memory storing instructions executable by the processor; and
   (d) a non-transitory memory storing a control algorithm that can be read by said processor;
   (e) wherein said instructions, when executed by the processor, perform one or more steps comprising:
      (i) using input from said one or more input sensors and said control algorithm, predicting heat transfer rate and drying time for a wet livestock;
      (ii) using the predicted heat transfer rate to control speed of a fan blowing air over livestock sprayed with water to ensure that a minimum cooling rate for the livestock is maintained; and
      (iii) using the predicted drying time to control frequency of said water spray to ensure that that the livestock is cooled without using more water than is required to maintain the minimum cooling rate.

2. The apparatus of claim 1, wherein said instructions when executed by said processor further perform one or more steps comprising calculating cumulative heat rejection rates over time and using weather forecast data to control said fan and water spray.

3. The apparatus of claim 1, wherein said instructions comprise a control algorithm based on heat transfer rates and drying times calculated from best-fit correlations derived from a heat transfer model.

4. The apparatus of claim 1, wherein said control algorithm comprises a lookup table or set of equations that select fan speed and water spray interval based on input from said one or more input sensors.

5. An apparatus for controlling water cooling of livestock, the apparatus comprising:
   (a) at least one fan with a fan speed producing an airflow;
   (b) at least one water sprayer with a flow rate;
   (c) one or more input sensors selected from the group of sensors consisting of a temperature sensor, a humidity sensor, a wind speed sensor, and a surrounding surface temperature sensor;
   (d) a controller with a processor configured to receive input from one or more of said input sensors and produce output control signals to said fan and said sprayer; and
   (e) a non-transitory memory storing instructions executable by the processor;
   (f) wherein said instructions, when executed by the processor, perform one or more steps comprising:
      (i) acquiring sensor data from said one or more input sensors;
      (ii) predicting a heat transfer rate and drying time of a subject from said sensor data;
      (iii) controlling sprayer actuation and sprayer duration to wet the subject; and
      (iv) controlling fan speed and airflow over a subject to transfer heat from the subject.

6. The apparatus of claim 5, further comprising:
   a proximity sensor operably connected to the controller processor;
   wherein output control signals from the processor are not sent to the sprayer and fan unless the proximity sensor input indicates the proximity of the subject.

7. The apparatus of claim 5, wherein said instructions when executed by the controller processor further perform steps comprising:
   calculating a minimum cooling rate; and
   increasing or decreasing the fan speed over time to ensure that the calculated minimum cooling rate for the subject is maintained.

8. The apparatus of claim 5, wherein said instructions when executed by the controller processor further perform steps comprising:
   predicting a drying time for the subject; and
   matching a spray off time to the predicted drying time that corresponds to the current outdoor environmental conditions.

9. The apparatus of claim 8, wherein said spray off time is matched with a selected percentage of the predicted drying time in the range of 50% to 100% of the predicted time.

10. The apparatus of claim 8, wherein said drying time of the subject is predicted as a function of outdoor air temperature, air speed, humidity, and mean radiant temperature.

11. The apparatus of claim 5, wherein said instructions when executed by said processor further perform one or more steps comprising:
    calculating cumulative heat rejection rates over time; and
    using weather forecast data to control said fan speed and water spray.

12. The apparatus of claim 5, wherein said instructions when executed by said processor further perform one or more steps comprising:
    calculating cumulative heat rejection rates over time;
    calculating acquired heat load over time; and
    using calculated heat load and rejection rates to control said fan speed and water spray frequency.

13. The apparatus of claim 5, wherein said instructions comprise a control algorithm based on heat transfer rates and drying times calculated from best-fit correlations derived from a heat transfer model.

14. The apparatus of claim 5, wherein said control algorithm comprises a lookup table or set of equations that select fan speed and water spray interval based on input from said one or more input sensors.

15. The apparatus of claim 5, wherein said instructions when executed by the controller processor further perform steps comprising:
    receiving sensor inputs at regular intervals;
    recalculating heat transfer rate and drying time at each interval; and
    modifying fan air speed and spray intervals from the recalculated heat transfer rate and drying time;
    wherein modifications of fan air speed and spray intervals over the course of the day accounts for changes in outdoor conditions.

16. A method for controlling heat stress in livestock, the method comprising:
    (a) providing outdoor air temperature, air speed, humidity, and mean radiant temperature sensor data;

(b) predicting a heat rejection rate and drying time for a wet livestock from the sensor input;
(c) calculating a cooling load threshold from the rejection rate and drying time; and
(d) determining fan speed and sprinkler operation frequency needed to meet the cooling load threshold given the outdoor sensor data.

17. The method of claim 16, further comprising:
creating a one-dimensional simultaneous heat and mass transfer model of evaporation within wetted fur configured to estimate drying time and heat rejection rate based on ambient condition sensor data; and
calculating the cooling load threshold from the rejection rate and drying time estimated by the model.

18. The method of claim 16, further comprising: calculating a minimum cooling rate; and increasing or decreasing the fan speed over time to ensure that the minimum cooling rate for the livestock is maintained.

19. The method of claim 16, further comprising:
predicting a drying time for the livestock; and
matching a spray off time to the predicted drying time that corresponds to the current outdoor environmental conditions.

20. The method of claim 19, wherein said spray off time is matched with a selected percentage of the predicted drying time in the range of 50% to 100% of the predicted time.

21. The method of claim 16, further comprising:
receiving sensor inputs at regular intervals;
recalculating heat transfer rate and drying time at each interval; and
modifying fan air speed and spray intervals from the recalculated heat transfer rate and drying time;
wherein modifications of fan air speed and spray intervals over the course of the day accounts for frequently changing outdoor conditions.

22. The method of claim 16, further comprising:
receiving sensor inputs at regular intervals;
calculating cumulative heat rejection rates over time;
calculating acquired heat load over time; and
using calculated heat load and rejection rates to control said fan speed and water spray frequency.

* * * * *